May 22, 1928.
M. A. MANDL
PIE PAN
Filed Dec. 17, 1927
1,670,971
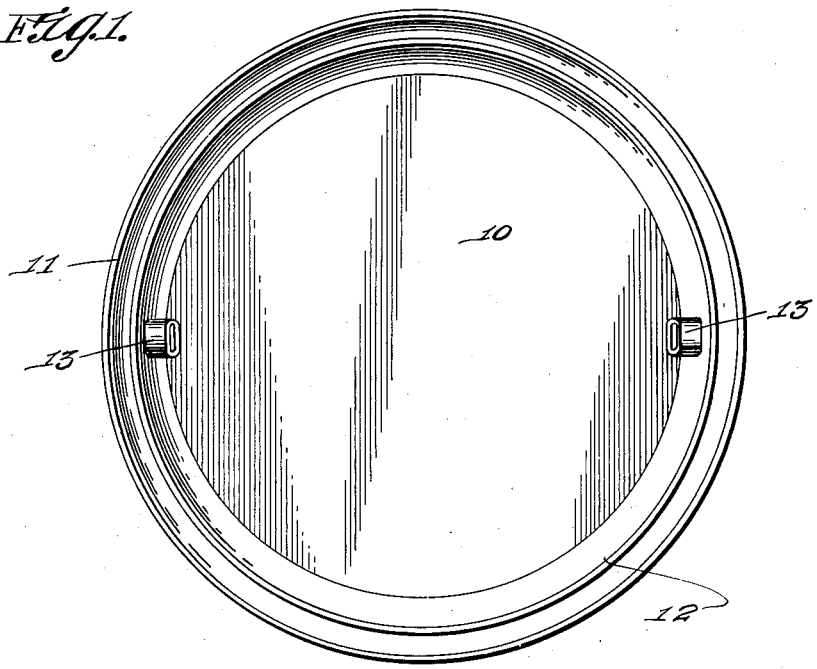
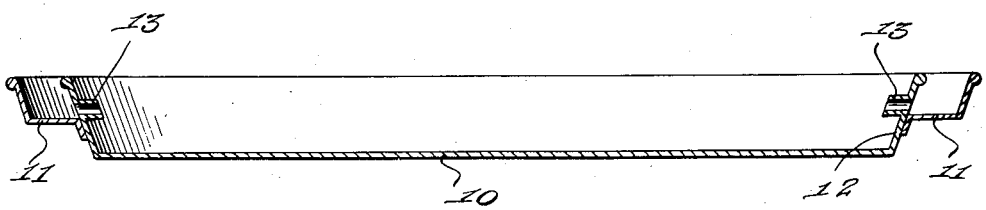
Mary A Mandl, INVENTOR
BY Victor J. Evans
ATTORNEY Patented May 22, 1928.

1,670,971

UNITED STATES PATENT OFFICE.

MARY A. MANDL, OF LEAVENWORTH, KANSAS.

PIE PAN.

Application filed December 17, 1927. Serial No. 240,822.

This invention has relation to the culinary art, which embodies certain new and useful improvements in pie pans, of which the following is the specification.

An object of the invention contemplates a trough carried by the pan adapted to catch the overflow from pies or puddings of juicy varieties.

Another object of the invention comprehends means for permitting the overflow to return to the body of the pie or pudding when the same has receded, either due to cooking or cooling.

With the above and other objects in view, the invention further consists of the following novel features and details of construction, to be hereinafter more fully described, illustrated in the accompanying drawing and pointed out in the appended claim.

In the drawing:

Figure 1 is a top plan view of the invention.

Figure 2 is a transverse sectional view taken therethrough.

Referring to the drawing in detail, wherein like characters of reference denote corresponding parts, the reference character 10 indicates a plan or receptacle, which in this instance is shown to be a pie pan.

As is generally known in the baking of pies of a juicy variety, the same frequently run over in the oven, thereby causing the loss of juice and the burning thereof which fills the house with obnoxious odors. It is my intention to overcome this difficulty by first catching the overflow and secondly by returning said overflow to its original source.

In carrying out the invention, I have provided a continuous trough 11 carried upon the outer side wall 12 of the pan 10. The periphery of the upstanding wall of the trough need not be any higher than the peripheral edge of the pan, which will be presently apparent. Tube members 13, inwardly projected from the side walls of the pan, are adapted to establish communication between the enclosure of the pan and the trough. Said tubes will permit the juice to run from the pie into the trough and back to the pie as it cooks down. Said tubes are projected immediately beneath the top crust whereas the outermost ends thereof are projected slight distances higher than the bottom wall of the trough, whereby the initial juice, finding its way within the trough, will offer no resistance to juice subsequently expelled or discharged from the pie during the process of baking.

The advantage of allowing the juice to pass backwardly and forwardly between the pie and trough is that the pie, when cooled, will not be dry as is usually the case, and which will keep for a longer period of time without becoming stale.

The tube members 13 are projected appreciable distances inwardly from the side wall 12 of the pan 10, whereby the innermost ends thereof may be projected through the bottom crust lining the bottom of the pan. The top crust of the pastry is extended over the tubes whereby the juice will flow back and forth as the pie boils and simmers.

The invention is susceptible of various changes in its form, proportions and minor details of construction, and the right is herein reserved to make such changes as properly fall within the scope of the appended claim.

Having described the invention, what is claimed is:

A pie pan, a trough surrounding the outer side walls of the pan and disposed in spaced relation thereto having its upper periphery arranged in line with that of the pan, and tubes inwardly projected from the innerside walls of the pan immediately above the bottom of the trough being adapted to establish communication between the pan and trough through the bottom pie crust to return the overflow to the pan.

In testimony whereof I affix my signature.

MARY A. MANDL.